United States Patent
Brown et al.

(10) Patent No.: US 6,217,059 B1
(45) Date of Patent: Apr. 17, 2001

(54) APPARATUS FOR HELPING TO PROTECT A VEHICLE OCCUPANT'S LEGS

(75) Inventors: Kevin M. Brown; Cris C. Cabral, both of Mesa; Albert N. Felix, Phoenix; Juede P. Pajela, Gilbert, all of AZ (US); Alexander Heilig, Waldstetten (DE)

(73) Assignees: TRW Inc., Lyndhurst, OH (US); TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/374,872

(22) Filed: Aug. 16, 1999

(51) Int. Cl.[7] .................................................. B60R 21/22
(52) U.S. Cl. ...................................... 280/730.2; 280/730.1
(58) Field of Search .......................... 280/730.1, 730.2, 280/732, 729, 752, 753

(56) References Cited

U.S. PATENT DOCUMENTS

| | | |
|---|---|---|
| 2,834,606 | 5/1958 | Bertrand . |
| 3,702,706 * | 11/1972 | Sobkow ........................... 280/730.1 |
| 4,227,717 * | 10/1980 | Bouvier ........................... 280/730.2 |
| 5,312,131 * | 5/1994 | Kitagawa et al. ................ 280/730.1 |

FOREIGN PATENT DOCUMENTS

| | | |
|---|---|---|
| 19639467 | 1/1998 | (DE) . |
| 197 35 915 * | 3/1998 | (DE) . |
| 3-281455 * | 12/1991 | (JP) ................................. 280/730.2 |

OTHER PUBLICATIONS

Håland, Y., Hjerpe, E., Lövsund, P., "An Inflatable Carpet to Reduce the Loading of the Lower Extremities—Evaluation by a New Sled Test Method with Toepan Intrusion", Paper No. 98–S1–P–18, 16th ESV Conference, Windsor, Canada, Jun. 1–4, 1998.

* cited by examiner

Primary Examiner—Peter C. English
(74) Attorney, Agent, or Firm—Tarolli, Sundheim, Covell, Tummino & Szabo L.L.P.

(57) ABSTRACT

A safety apparatus (70) for helping to protect an occupant (30) of a vehicle (10) in the event of a vehicle collision comprises an air bag system including at least one inflatable air bag (80) having a deflated condition and an inflated condition. The air bag (80), when inflated, unlocks at least one of the occupant's knees (50) to minimize forces transmitted through at least the corresponding one of the occupant's legs (40) to the occupant's pelvis (36). Seat belt webbing (74) restrains forward movement of the occupant (30) relative to the vehicle (10) when the occupant's knee (50) is unlocked.

22 Claims, 4 Drawing Sheets

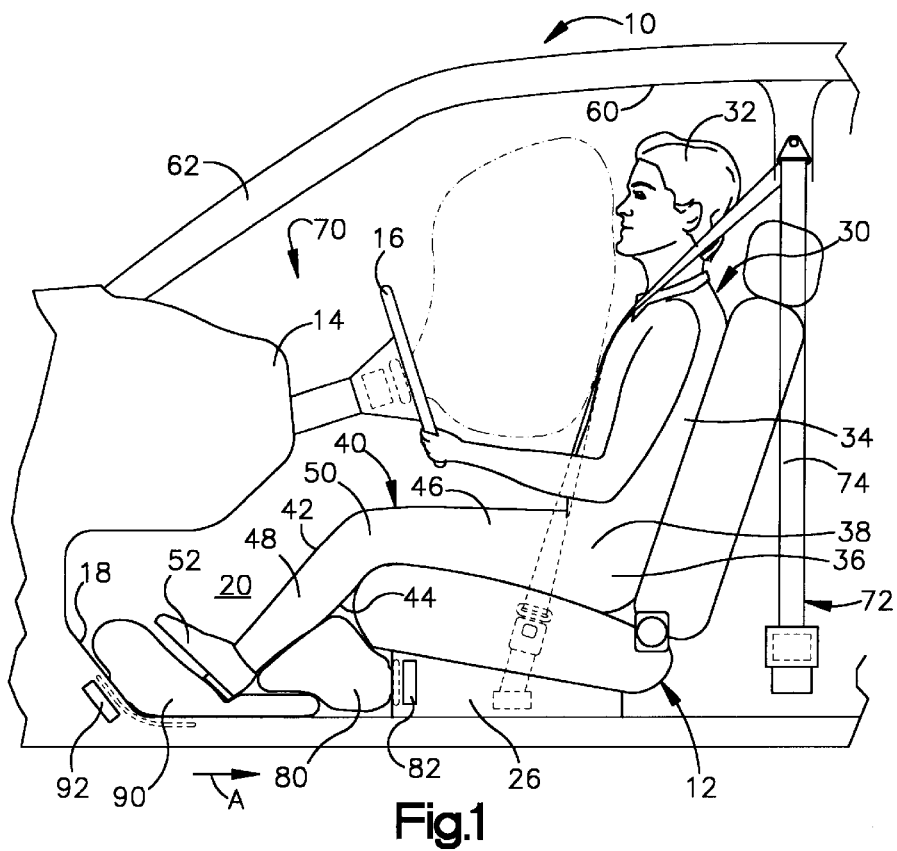
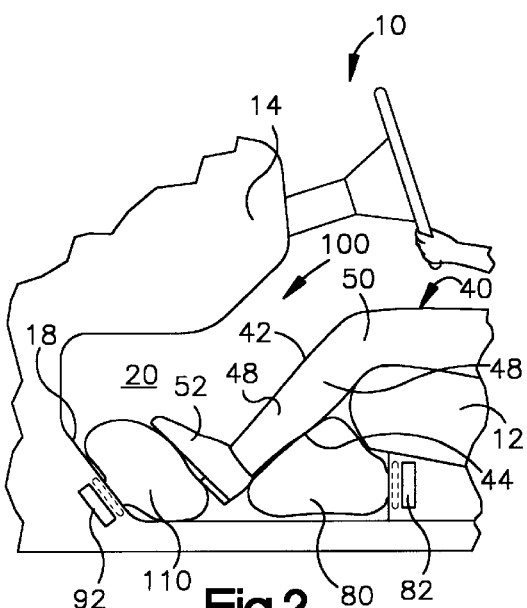
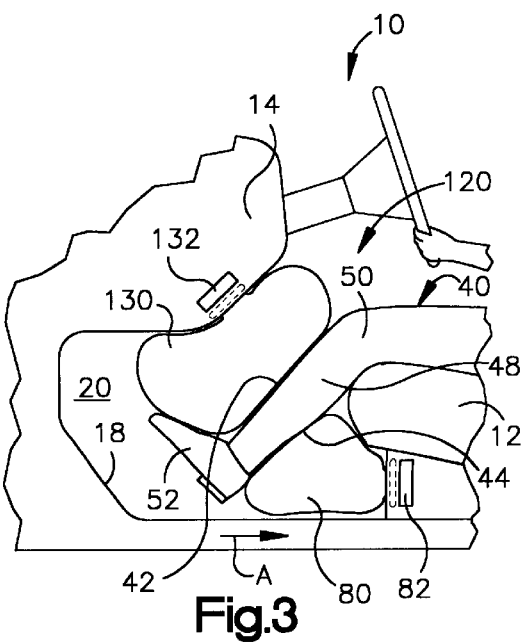

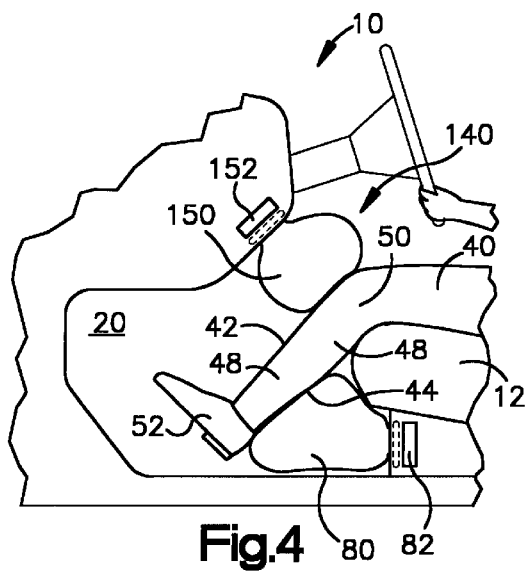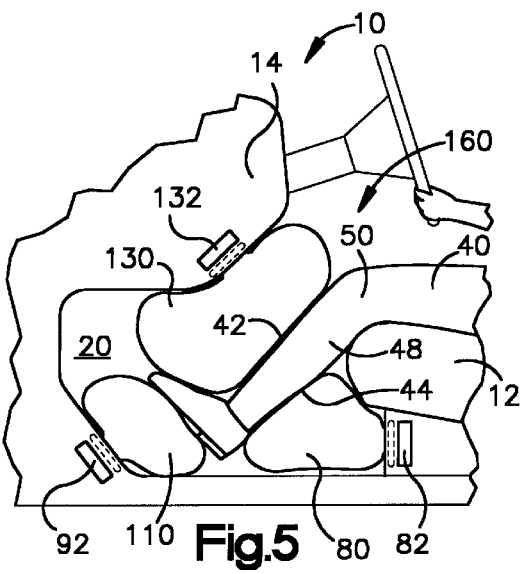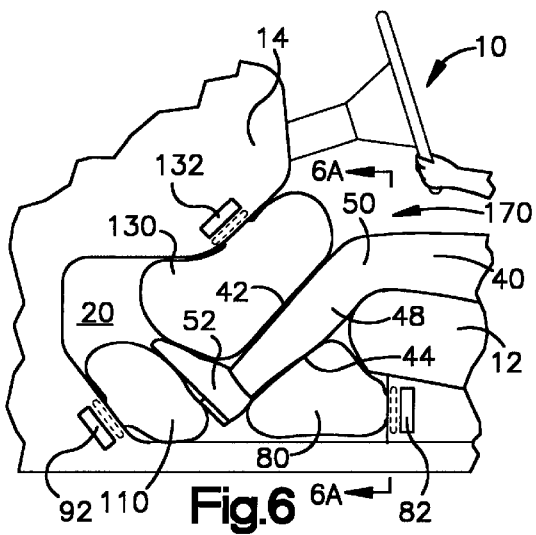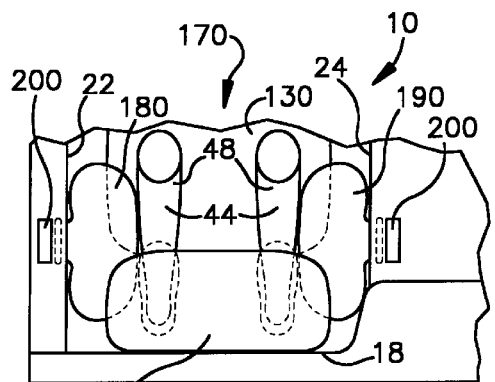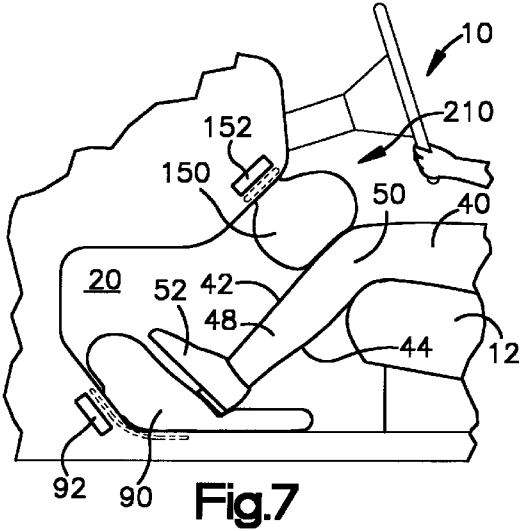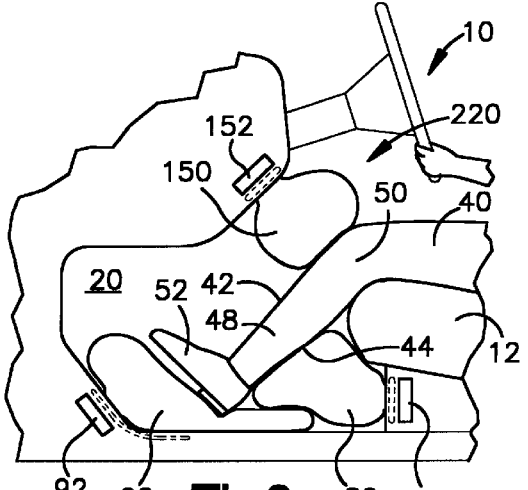

APPARATUS FOR HELPING TO PROTECT A VEHICLE OCCUPANT'S LEGS

FIELD OF THE INVENTION

The present invention relates to an apparatus for helping to protect a vehicle occupant in the event of a vehicle collision, and is particularly directed to an apparatus which helps to protect the lower legs and the pelvis of the vehicle occupant.

BACKGROUND OF THE INVENTION

It is known to help protect a vehicle occupant from injury during a vehicle collision by inflating an inflatable occupant restraint such as an air bag. Air bags are known to inflate into the passenger compartment of the vehicle from a variety of vehicle locations including the steering wheel, the instrument panel, the side doors, and the headliner. It is also known to position an inflatable restraint in the area of a knee bolster in the vehicle to help protect the knees of the vehicle occupant during a collision.

During a vehicle collision, it is possible for deformed portions of the vehicle body to penetrate into the footwell of the vehicle where the occupant's lower legs and feet are located. Accordingly, an apparatus which helps to protect the occupant's lower legs and feet from the penetrating vehicle body portions is desirable.

In addition, during a vehicle collision, it is possible that the vehicle occupant's knees can become locked. With the occupant's knees in a locked condition, forces on the occupant's lower extremities, such as the occupant's feet, can be transmitted through the occupant's legs to the occupant's pelvis and cause injuries to the occupant's hip and/or pelvic areas. Accordingly, an apparatus that unlocks the occupant's knees would decrease the transmission of such forces and would thus help to protect against injury to the occupant's hips and pelvis.

SUMMARY OF THE INVENTION

The present invention is a safety apparatus for helping to protect an occupant of a vehicle in the event of a vehicle collision. The apparatus comprises an air bag system including at least one inflatable air bag having a deflated condition and an inflated condition. The air bag, when inflated, unlocks at least one of the occupant's knees to minimize forces transmitted through at least the corresponding one of the occupant's legs to the occupant's pelvis. Seat belt webbing restrains forward movement of the occupant relative to the vehicle when at the least one of the occupant's knees is unlocked.

In accordance with one embodiment of the invention, the at least one air bag, as it inflates, engages the bottom of at least one of the occupant's shoes and lifts the at least one of the occupant's lower legs to cause the at least one of the lower legs to pivot at the occupant's knee.

In accordance with another embodiment of the invention, the at least one air bag engages the shin of each of the occupant's lower legs and pivots the lower legs at the occupant's knees rearwardly in the vehicle.

In accordance with yet another embodiment of the invention, the at least one air bag engages the back of the at least one of the occupant's lower legs and pivots the at least one of the lower legs at the occupant's knee.

In accordance with still another embodiment of the invention, the apparatus further includes additional air bags which are respectively inflatable into positions on opposite sides of the lower legs of the vehicle occupant.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic side view of an occupant seated in a vehicle having an apparatus for helping to protect the occupant constructed in accordance with a first embodiment of the present invention;

FIG. 2 is a schematic side view illustrating an apparatus for helping to protect the occupant constructed in accordance with a second embodiment of the present invention;

FIG. 3 is a schematic side view illustrating an apparatus for helping to protect the occupant constructed in accordance with a third embodiment of the present invention;

FIG. 4 is a schematic side view illustrating an apparatus for helping to protect the occupant constructed in accordance with a fourth embodiment of the present invention;

FIG. 5 is a schematic side view illustrating an apparatus for helping to protect the occupant constructed in accordance with a fifth embodiment of the present invention;

FIG. 6 is a schematic side view illustrating an apparatus for helping to protect the occupant constructed in accordance with a sixth embodiment of the present invention;

FIG. 6A is a schematic view taken along 6A—6A in FIG. 6;

FIG. 7 is a schematic side view illustrating an apparatus for helping to protect the occupant constructed in accordance with a seventh embodiment of the present invention;

FIG. 8 is a schematic side view illustrating an apparatus for helping to protect the occupant constructed in accordance with an eighth embodiment of the present invention;

DESCRIPTION OF PREFERRED EMBODIMENTS

Figure 9:
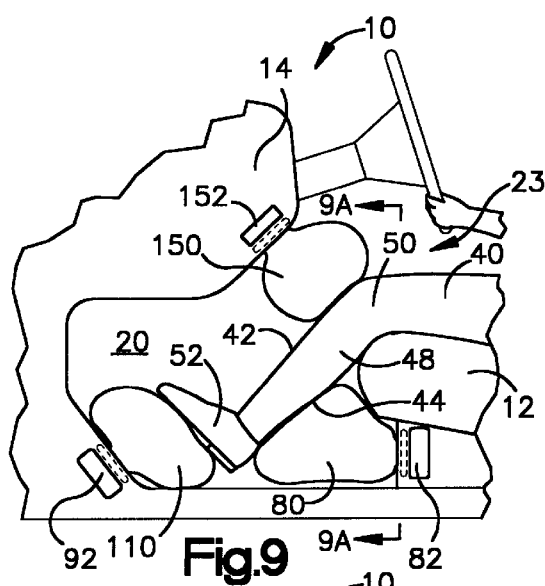
FIG. 9 is a schematic side view illustrating an apparatus for helping to protect the occupant constructed in accordance with a ninth embodiment of the present invention.

The present invention relates to an apparatus for helping to protect a vehicle occupant in the event of a vehicle collision, and is particularly directed to an apparatus that helps to protect the lower legs and the pelvis of the vehicle occupant. As representative of the present invention, FIG. 1 schematically illustrates a portion of a vehicle 10 having a vehicle seat 12 in which a vehicle occupant 30 is seated. The vehicle 10 includes an instrument panel 14, a steering wheel 16, a floorboard 18, and a footwell 20 located under the instrument panel and partially defined by the floorboard. The footwell 20 is further defined by opposing side panels 22 and 24, respectively (FIG. 6A). The vehicle seat 12 is mounted to the floorboard 18 in the vehicle 10 by a seat support 26 (FIG. 1).

The occupant 30 of the vehicle seat 12 has a head 32, a torso 34, a pelvic area 36 which includes hips 38, and a pair of legs 40 extending from the hips. Each of the occupant's legs 40 has a front side 42 and a back side 44. Further, each leg 40 includes an upper leg portion 46 and a lower leg portion 48 pivotally connected by a knee 50. A shoe-covered foot 52 extends from each of the lower leg portions 48 of the occupant's legs 40. The lower leg portions 48, including the feet 52, are located in the footwell 20 in the vehicle 10.

In accordance with a first embodiment of the invention, the vehicle 10 includes a safety apparatus 70 for helping to protect the lower leg portions 48 and the pelvis 36 of the occupant 30. The safety apparatus 70 includes a three-point continuous loop seat belt system 72. The seat belt system 72 comprises seat belt webbing 74 that is extensible about the torso 34 and the pelvic area 36 of the occupant 30 to restrain forward movement of the occupant during a vehicle collision, as is known in the art. The safety apparatus 10 can further include any number of known inflatable occupant protection devices, otherwise referred to as air bags, for helping to protect the head and the torso of the occupant. Such air bags may be mounted in the steering wheel 16, as shown schematically in FIG. 1, or any of various other known mounting locations, such as the instrument panel 14, the vehicle seat 12, vehicle side doors (not shown), a vehicle headliner 60, or a vehicle roof pillar 62.

The safety apparatus 70 comprises an inflatable calf air bag 80 and an inflatable floormat air bag 90. The calf air bag 80 has a deflated condition, shown in dashed lines in FIG. 1, and an inflated condition, shown in solid lines in FIG. 1. In the deflated condition, the calf air bag 80 is folded up and is located under the vehicle seat 12. An actuatable inflator 82 for inflating the calf air bag 80 is also located under the vehicle seat 12. The floormat air bag 90 has a deflated condition, shown in dashed lines in FIG. 1, and an inflated condition, shown in solid lines in FIG. 1. In the deflated condition, the floormat air bag 90 is folded up and is located under the floor-board 18. An actuatable inflator 92 for inflating the floormat air bag 90 is also located under the floorboard 18.

In the event that conditions indicative of a vehicle collision are sensed by one or more collision sensors (not shown) in the vehicle 10, the inflators 82 and 92 are actuated and begin to inflate the calf and floormat air bags 80 and 90, respectively, in the footwell 20. As the calf air bag 80 begins inflating, the calf air bag engages the back 44, or calf, of the lower leg portion 48 of each of the occupant's legs 40. When the floormat air bag 90 begins inflating, the floormat air bag 90 engages the bottom of the shoes on the occupant's feet 52. Continued inflation of the calf air bag 80 toward the inflated condition shown in FIG. 1 raises the lower leg portions 48 to allow the lower leg portions of the occupant's legs 40 to pivot rearward, as indicated by arrow A, about the occupant's knees 50. In addition, the inflating floormat air bag 90 also raises the occupant's lower leg portions 48 and causes the lower leg portions to pivot about the occupant's knees 50.

The inflation of the calf air bag 80 and the floormat bag 90 into engagement with the occupant's lower leg portions 48 and the occupant's feet 52 helps to protect the lower leg portions and the feet from injury resulting from the penetration of deformed vehicle body parts into the footwell 20 of the vehicle 10. Moreover, by raising the occupant's lower leg portions 48 and pivoting the lower leg portions rearward about the occupant's knees 50, the occupant's knees are prevented from locking. With the occupant's knees 50 unlocked, the transmission of forces through the occupant's legs 40 to the occupant's hips 38 and pelvis 36 is minimized.

A safety apparatus 100 constructed according to a second embodiment of the present invention is schematically illustrated in FIG. 2. The safety apparatus 100 is identical to the safety apparatus 70 of FIG. 1, except for a foot air bag 110 under the occupant's feet 52 instead of the floormat air bag 90. The foot air bag 110, which is an alternative to the floormat air bag 90 of FIG. 1, is slightly smaller in size than the floormat air bag and, when inflated, does not extend entirely under the feet 52 of the occupant 30.

The safety apparatus 110 of FIG. 2 functions identically to the safety apparatus 70 of FIG. 1 in the event of a vehicle collision to help protect the occupant's lower leg portions 48, including the feet 52, and to unlock the occupant's knees 50 to help protect against injury to the occupant's pelvis 36.

A safety apparatus 120 constructed in accordance with a third embodiment of the present invention is schematically illustrated in FIG. 3. In the third embodiment of FIG. 3, parts of the safety apparatus 120 which are identical to parts shown in previous embodiments are identified by the same reference numbers. The safety apparatus 120 includes the seat belt webbing system 72, shown in FIG. 1, which is omitted from FIG. 3 for clarity.

According to the third embodiment of the invention, the safety apparatus 120 comprises the calf air bag 80 and an inflatable shin air bag 130. The shin air bag 130 has a deflated condition, shown in dashed lines in FIG. 3, and an inflated condition, shown in solid lines in FIG. 3. In the deflated condition, the shin air bag 130 is folded up and is located under the instrument panel 14. An actuatable inflator 132 for inflating the shin air bag 130 is also located under the instrument panel 14.

In the event that conditions indicative of a vehicle collision are sensed by the collision sensors (not shown), the inflators 82 and 132 are actuated and begin to inflate the calf and shin air bags 80 and 130, respectively, in the footwell 20. As the calf air bag 80 begins inflating, the calf air bag engages the back 44, or calf, of the lower leg portion 48 of each of the occupant's legs 40. When the shin air bag 130 begins inflating, the shin air bag engages the front 42, or shin, of the occupant's lower leg portions 48. Continued inflation of the calf air bag 80 toward the inflated condition shown in FIG. 3 raises the lower leg portions 48 and allows the lower leg portions of the occupant's legs 40 to pivot in the direction of arrow A about the occupant's knees 50. In addition, the inflating shin air bag 130 pushes against the occupant's lower leg portions 48 to cause the lower leg portions, which are being raised by the calf air bag 80, to pivot about the occupant's knees 50.

The inflation of the calf air bag 80 and the shin air bag 130 into engagement with the occupant's lower leg portions 48 and the occupant's feet 52 helps to protect the lower leg portions and the feet from injury resulting from the penetration of deformed vehicle body parts into the footwell 20 of the vehicle 10. Moreover, by raising the occupant's lower leg portions 48 and pivoting the occupant's lower leg portions about the occupant's knees 50, the occupant's knees are prevented from locking. With the occupant's knees 50 unlocked, the transmission of forces through the occupant's legs 40 to the occupant's hips 38 and pelvis 36 is minimized.

A safety apparatus 140 constructed according to a fourth embodiment of the present invention is schematically illustrated in FIG. 4. The safety apparatus 140 is identical to the safety apparatus of FIG. 3, except that an inflatable knee air bag 150 replaces the shin air bag 130. The knee air bag 150, which is an alternative to the shin air bag 130 of FIG. 3, is slightly smaller in size than the shin air bag and does not engage the entire front side 42 of the occupant's lower leg portions 48. Rather, the knee air bag 150 engages a smaller area on the front side 42 of the occupant's lower leg portions 48 just below the occupant's knees 50 to cushion any forward movement of the lower leg portions in a vehicle collision. In all other respects, the safety apparatus 140 of FIG. 4 functions the same as the safety apparatus 120 of FIG. 3 to help protect the occupant's lower leg portions 48, including the feet 52, and to unlock the occupant's knees to help protect against injury to the occupant's pelvis 36.

A safety apparatus 160 constructed in accordance with a fifth embodiment of the present invention is schematically illustrated in FIG. 5. In the fifth embodiment shown in FIG. 5, parts of the safety apparatus 160 which are identical to parts shown in previous embodiments are identified by the same reference numbers. The safety apparatus 160 includes the seat belt system 72 which is omitted from FIG. 5 for clarity.

Accordance to the fifth embodiment of the invention, the safety apparatus 160 comprises the calf air bag 80, the foot air bag 110, and the shin air bag 130, all of which are described above. In the event that conditions indicative of a vehicle collision are sensed by one of the collision sensors (not shown), the respective inflator associated with each of the air bags 80, 110, and 130 is actuated, and the air bags begin to inflate in the footwell 20. The inflating calf air bag 80 raises the lower leg portions 48 of the occupant's legs 40 to allow the lower leg portions to pivot rearward about the occupant's knees 50. The inflating shin air bag 130 pushes against the occupant's lower leg portions 48 to cause the lower leg portions to pivot about the occupant's knees. Simultaneously, the inflating foot air bag 110 lifts the occupant's lower leg portions 48 to help cause the lower leg portions to pivot about the occupant's knees 50.

The inflation of the calf, foot, and shin air bags 80, 110, and 130 into engagement with the occupant's lower leg portions 48 and the occupant's feet 52 helps to protect the lower leg portions and the feet from injury resulting from the penetration of deformed vehicle body parts into the footwell 20 of the vehicle 10. Moreover, by raising the occupant's lower leg portions 48 and pivoting the occupant's lower leg portions about the occupant's knees 50, the occupant's knees are prevented from locking. With the occupant's knees 50 unlocked, the transmission of forces through the occupant's legs 40 to the occupant's hips 38 and pelvis 36 is minimized.

A safety apparatus 170 constructed according to a sixth embodiment of the present invention is schematically illustrated in FIGS. 6 and 6A. The safety apparatus 170 is similar to the safety apparatus of FIG. 5 and includes the calf air bag 80, the foot air bag 110, and the shin air bag 130. The safety apparatus 170 further includes a pair of lateral air bags 180 and 190 which are located on opposite sides of the footwell 20. Each of the lateral air bags 180 and 190 has a deflated condition in which it is folded up and disposed behind a respective one of the side panels 22 and 24 defining the footwell 20. An inflator 200 for inflating each of the lateral air bags 180 and 190 lies next to each of the air bags in their deflated condition. The lateral air bags 180 and 190 inflate into respective positions on the outside of each of the lower leg portions 48 of the occupants legs 40, as shown in FIG. 6A.

The safety apparatus 170 of FIGS. 6 and 6A functions similarly to the safety apparatus 160 of FIG. 5 to help protect the occupant's lower legs portions 48, including the occupant's feet 52, and to unlock the occupant's knees 50 to help protect against injury to the occupant's pelvis 36. The addition of the lateral air bags 180 and 190 increases the ability of the safety apparatus 170 to protect against body parts intruding into the footwell 20 during a vehicle collision.

A safety apparatus 210 constructed in accordance with a seventh embodiment of the present invention is schematically illustrated in FIG. 7. In the seventh embodiment of FIG. 7, parts of the safety apparatus 210 which are identical to parts shown in previous embodiments are identified by the same reference numbers. The safety apparatus 210 includes the seat belt system 72 which is omitted from FIG. 7 for clarity.

According to the seventh embodiment of the invention, the safety apparatus 210 comprises the knee air bag 150 described in the fourth embodiment, and the inflatable floormat air bag 90 described in the first embodiment. In the event that conditions indicative of a vehicle collision are sensed by the collision sensors (not shown), the inflators 92 and 152 are actuated and begin to inflate the floormat bag 90 and the knee air bag 150, respectively, in the footwell 20. As the floormat air bag 90 inflates, the floormat air bag engages the bottom of the shoes on the occupant's feet 52 and lifts the occupant's lower leg portions 48 to cause the lower leg portions to pivot about the occupant's knees 50. As the knee air bag 150 inflates, the knee air bag engages the front 42 of the occupant's lower leg portions 48 just below the occupant's knees 50 to cushion against any forward movement of the lower leg portions in a vehicle collision.

The inflation of the floormat air bag 90 and the knee air bag 150 into engagement with the occupant's lower leg portions 48 and the occupant's feet 52 helps to protect the lower leg portions and the feet from injury resulting from the penetration of deformed vehicle body parts into the footwell 20 of the vehicle 10. Moreover, by raising the occupant's lower leg portions 48 and pivoting the occupant's lower leg portions about the occupant's knees 50, the occupant's knees are prevented from locking. With the occupant's knees 50 unlocked, the transmission of forces through the occupant's legs 40 to the occupant's hips 38 and pelvis 36 is minimized.

A safety apparatus 220 constructed in accordance with an eighth embodiment of the present invention is schematically illustrated in FIG. 8. The safety apparatus 220 of FIG. 8 is similar to the safety apparatus 210 of FIG. 7, but further includes the calf air bag 80 previously described. The calf air bag 80, which inflates at the same time as the floormat air bag 90 and the knee air bag 150, raises the lower leg portion 48 to allow the lower leg portion to pivot rearward at the occupant's knees 50. The safety apparatus 220 of FIG. 8 thus functions similarly to the previously described embodiments to help protect the occupant's lower leg portions 48, and to unlock the occupant's knees 50 to help protect against injury to the occupant's pelvis 36.

Figure 9A:
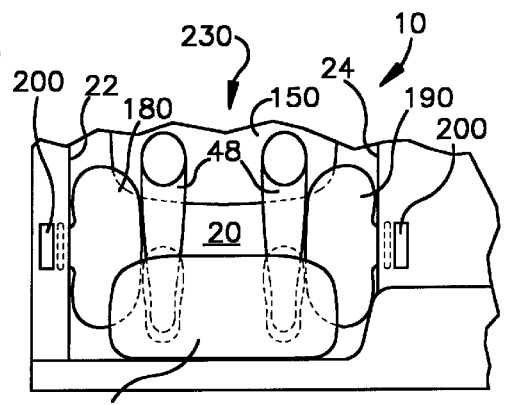
FIG. 9A is a schematic view taken along line 9A—9A in FIG. 9.

A safety apparatus 230 constructed in accordance with a ninth embodiment of the present invention is schematically illustrated in FIGS. 9 and 9A. The safety apparatus 230 is similar to the safety apparatus 170 of FIGS. 6 and 6A, and includes the calf air bag 80, the foot air bag 110, and the lateral air bags 180 and 190. The safety apparatus 230 differs from the embodiment of FIG. 6 by employing the knee air bag 150 instead of the shin air bag 130. The knee air bag 150 cushions any forward movement of the lower leg portions 48 in a vehicle collision. In all other respects, the safety apparatus 230 of FIGS. 9 and 9A functions in the same way as the safety apparatus 170 of FIG. 6 to help protect the occupant's lower leg portions 48, and to unlock the occupant's knees 50 to help protect against injury to the occupant's pelvis 36.

Figure 10:
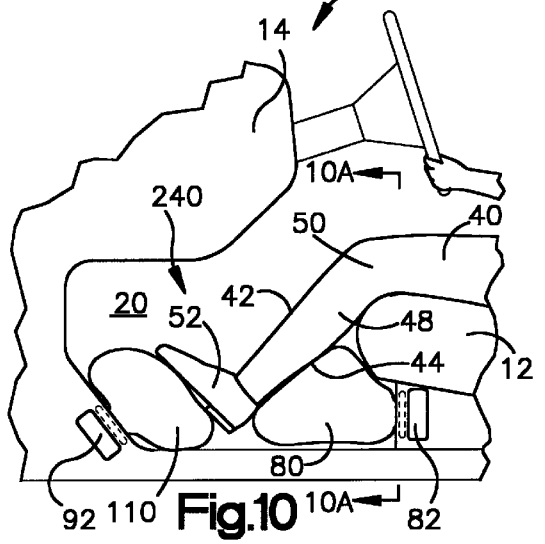
FIG. 10 is a schematic side view illustrating an apparatus for helping to protect the occupant constructed in accordance with a tenth embodiment of the present invention.
Figure 10A:
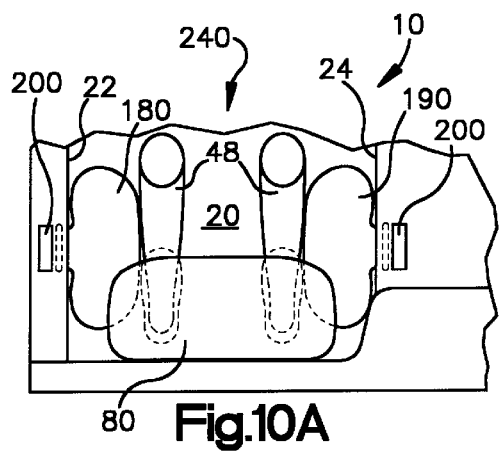
FIG. 10A is a schematic view taken along line 10A—10A in FIG. 10.

A safety apparatus 240 constructed in accordance with a tenth embodiment of the present invention is schematically illustrated in FIGS. 10 and 10A. The safety apparatus 240 is similar to the safety apparatus 100 of FIG. 2 and includes the calf air bag 80 and the foot air bag 110. The safety apparatus 240 of FIGS. 10 and 10A further includes the lateral air bags 180 and 190. The safety apparatus 240 of FIGS. 10 and 10A functions similarly to the safety apparatus 100 of FIG. 2 to help protect the occupant's lower leg portions 48, and to unlock the occupant's knees 50 to help protect against injury to the occupant's pelvis 36. In addition, the lateral air bags 180 and 190 increase the ability of the safety apparatus 240 to protect against vehicle body parts intruding into the footwell 20 during a vehicle collision.

Figure 11:
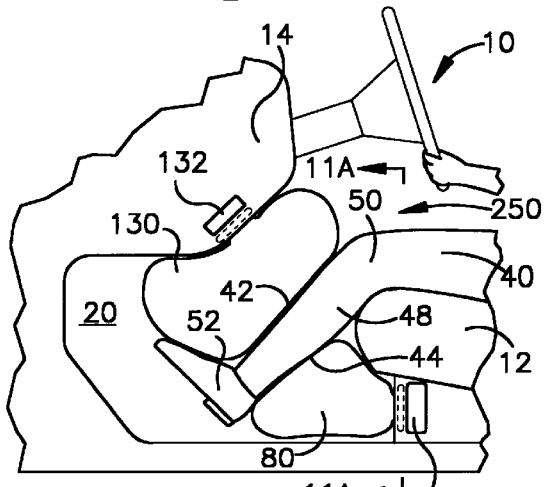
FIG. 11 is a schematic side view illustrating an apparatus for helping to protect the occupant constructed in accordance with an eleventh embodiment of the present invention.
Figure 11A:
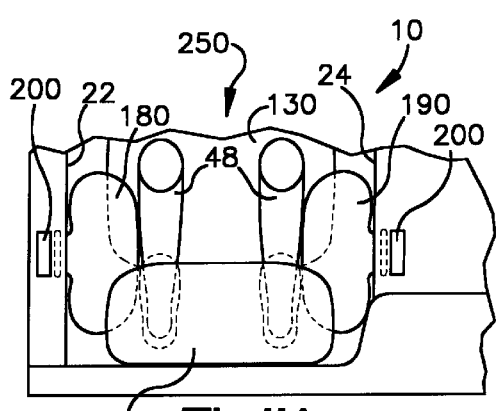
FIG. 11A is a schematic view taken along line 11A—11A in FIG. 11.

A safety apparatus 250 constructed in accordance with an eleventh embodiment of the present invention is schematically illustrated in FIGS. 11 and 11A. The safety apparatus 250 is similar to the safety apparatus 120 of FIG. 3 and includes the calf air bag 80 and the shin air bag 130. The safety apparatus 250 of FIGS. 11 and 11A further includes the lateral air bags 180 and 190. The safety apparatus 250 of FIGS. 11 and 11A functions similarly to the safety apparatus 120 of FIG. 3 to help protect the occupant's lower leg portions 48, and to unlock the occupant's knees 50 to help protect against injury to the occupant's pelvis 36. In addition, the lateral air bags 180 and 190 increase the ability of the safety apparatus 250 to protect against vehicle body parts intruding into the footwell 20 during a vehicle collision.

Figure 12:
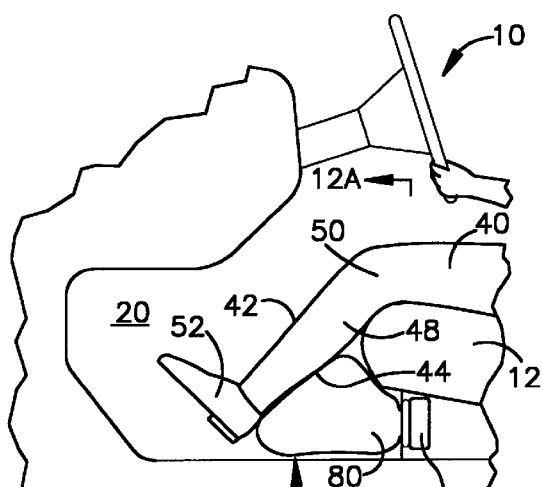
FIG. 12 is a schematic side view illustrating an apparatus for helping to protect the occupant constructed in accordance with a twelfth embodiment of the present invention.
Figure 12A:
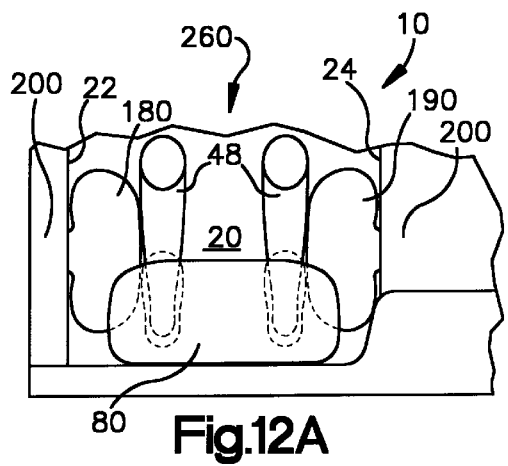
FIG. 12A is a schematic view taken along line 12A—12A in FIG. 12.

A safety apparatus 260 constructed in accordance with a twelfth embodiment of the present invention is schematically illustrated in FIGS. 12 and 12A. The safety apparatus 260 is similar to the safety apparatus 250 of FIG. 11, and includes the calf air bag 80 and the lateral air bags 180 and 190. The safety apparatus 260 of FIG. 12 does not, however, include the shin air bag 130. The lateral air bags 180 and 190 help to protect the occupant's lower leg portions 48 from vehicle body parts intruding into the footwell 20 during a vehicle collision. The calf air bag 80 raises the lower leg portions 48 and unlocks the occupant's knees 50 so that the lower leg portions can pivot rearward in order to minimize the transmission of forces through the legs 40 to the hips 38 and the pelvis 36.

Figure 13:
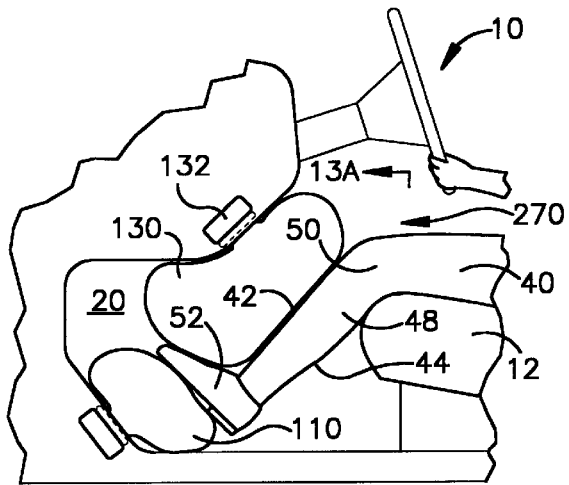
FIG. 13 is a schematic side view illustrating an apparatus for helping to protect the occupant constructed in accordance with a thirteenth embodiment of the present invention.
Figure 13A:
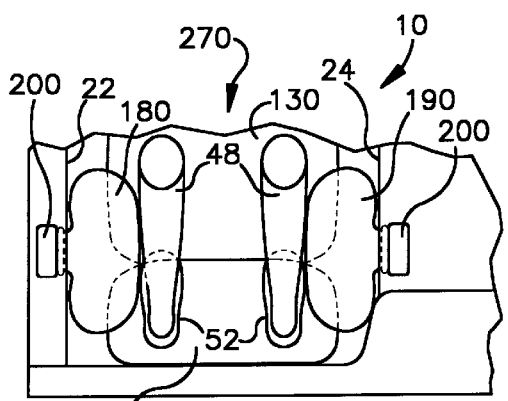
FIG. 13A is a schematic view taken along line 13A—13A in FIG. 13.

A safety apparatus 270 constructed in accordance with a thirteenth embodiment of the present invention is schematically illustrated in FIGS. 13 and 13A. The safety apparatus 270 is similar to the safety apparatus 160 of FIG. 5 and includes the foot air bag 110 and the shin air bag 130. The safety apparatus 270 of FIGS. 13 and 13A further includes the lateral air bags 180 and 190. The safety apparatus 270 of FIGS. 13 and 13A functions similarly to the safety apparatus 160 of FIG. 5 to help protect the occupant's lower leg portions 48, and to unlock the occupant's knees 50 to help protect against injury to the occupant's pelvis 36. In addition, the lateral air bags 180 and 190 increase the ability of the safety apparatus 270 to protect against vehicle body parts intruding into the footwell 20 during a vehicle collision.

Figure 14:
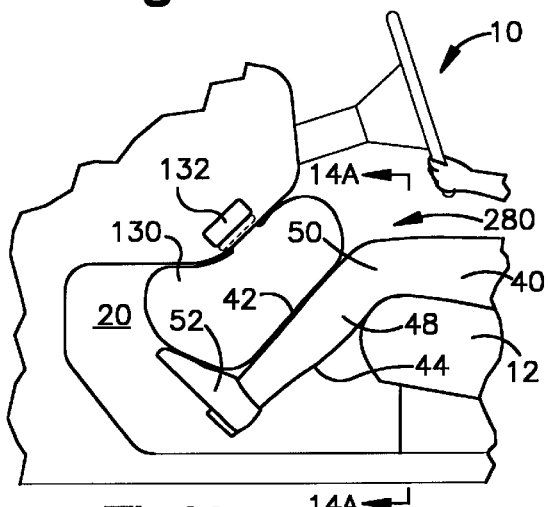
FIG. 14 is a schematic side view illustrating an apparatus for helping to protect the occupant constructed in accordance with a fourteenth embodiment of the present invention.
Figure 14A:
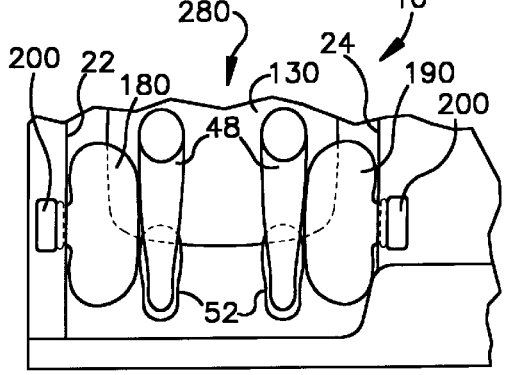
FIG. 14A is a schematic view taken along line 14A—14A in FIG. 14.

A safety apparatus 280 constructed in accordance with a fourteenth embodiment of the present invention is schematically illustrated in FIGS. 14 and 14A. The safety apparatus 280 is similar to the safety apparatus 270 of FIG. 13 and includes the shin air bag 130 and the lateral air bags 130 and 190. However, the safety apparatus 280 of FIG. 14 does not include the foot air bag 110. The lateral air bags 180 and 190 help to protect the occupant's lower leg portions 48 from vehicle body parts intruding into the footwell 20 during a vehicle collision. The shin air bag 130 engages the front 42 of the lower leg portions 48 and pivots the lower leg portions rearward about the occupant's knees 50 to unlock the occupant's knees and thereby minimize the transmission of forces through the occupant's legs 40 to the hips 30 and pelvis 36.

From the above description of the invention, those skilled in the art will perceive improvements, changes and modifications. Such improvements, changes and modifications within the skill of the art are intended to be covered by the appended claims.

Having described the invention, we claim:

1. A safety apparatus for helping to protect the lower legs of a vehicle occupant during a vehicle collision, said safety apparatus including:
   a first air bag inflatable into engagement with the bottom of at least one of the vehicle occupant's shoes; and
   a second air bag inflatable into engagement with the back of at least one of the vehicle occupant's lower legs.

2. A safety apparatus as defined in claim 1 further including a third air bag inflatable into engagement with the front of the vehicle occupant's lower legs.

3. A safety apparatus as defined in claim 2 further including fourth and fifth air bags which are respectively inflatable into positions on opposite sides of the lower legs of the vehicle occupant.

4. A safety apparatus as defined in claim 1 further including additional air bags which are respectively inflatable into positions on opposite sides of the lower legs of the vehicle occupant.

5. A safety apparatus for helping to protect the lower legs of a vehicle occupant during a vehicle collision, said apparatus comprising:
   an inflatable air bag inflatable into a position to engage the back of at least one of the vehicle occupant's lower legs; and
   an inflator for inflating said inflatable air bag.

6. A safety apparatus as defined in claim 5 wherein said inflatable air bag, when inflated by said inflator, has a portion which engages the back of the at least one of the vehicle occupant's lower legs and which raises the at least one lower leg to unlock the vehicle occupant's corresponding knee.

7. The safety apparatus as defined in claim 6 further including a second inflatable air bag which, as it inflates, engages the bottom of at least one of the occupant's shoes and lifts the at least one of the vehicle occupant's lower legs to cause the at least one lower leg to pivot at the occupant's corresponding knee.

8. The safety apparatus as defined in claim 7 further including additional air bags which are respectively inflatable into positions on opposite sides of the lower legs of the vehicle occupant.

9. The safety apparatus as defined in claim 6 further including a second air bag inflatable into engagement with the shin of each of the vehicle occupant's lower legs to help pivot the lower legs at the occupant's knees rearwardly in the vehicle.

10. The safety apparatus as defined in claim 9 further including a third inflatable air bag which, as it inflates, engages the bottom of at least one of the occupant's shoes and lifts at least a corresponding one of the vehicle occupant's lower legs to cause the corresponding lower leg to pivot at the occupant's corresponding knee.

11. The safety apparatus as defined in claim 6 further including a second air bag which is inflatable in front of the vehicle occupant's lower legs to cushion forward movement of the lower legs in a vehicle collision.

12. The safety apparatus as defined in claim 11 further including third and fourth air bags which are respectively inflatable into positions on opposite sides of the lower legs of the vehicle occupant.

13. The safety apparatus as defined in claim 6 further including additional air bags which are respectively inflatable into positions on opposite sides of the lower legs of the vehicle occupant.

14. A safety apparatus for helping to protect an occupant of a vehicle in the event of a vehicle collision, said apparatus comprising:

an air bag system including at least one inflatable air bag having a deflated condition and an inflated condition, said air bag, when inflated, unlocking at least one of the occupant's knees to minimize forces transmitted through at least the corresponding one of the occupant's lower legs to the occupant's pelvis; and seat belt webbing for restraining forward movement of the occupant relative to the vehicle when the at least one of the occupant's knees is unlocked;

said at least one air bag being inflated into engagement with the at least one of the occupant's lower legs to cause the at least one of the occupant's lower legs to pivot at the occupant's corresponding knee;

said at least one air bag engaging the back of the at least one of the occupant's lower legs and raising the at least one lower leg to cause the at least one lower leg to pivot at the occupant's corresponding knee.

15. The safety apparatus as defined in claim 14 further including another air bag which is inflatable in front of the occupant's lower legs to cushion forward movement of the lower legs in a vehicle collision.

16. A safety apparatus for helping to protect a vehicle occupant in the event of a vehicle collision, said safety apparatus comprising:

a first air bag inflatable into a first position adjacent one side of the lower legs of the vehicle occupant;

a second air bag inflatable into a second position adjacent the other side of the lower legs of the vehicle occupant; and a third air bag inflatable into engagement with the back of at least one of the vehicle occupant's lower legs.

17. The safety apparatus as defined in claim 16 further including a fourth air bag inflatable into engagement with the front of the vehicle occupant's lower legs.

18. The safety apparatus as defined in claim 17 further including a fifth inflatable air bag which, as it inflates, engages the bottom of at least one of the occupant's shoes and lifts at least a corresponding one of the occupant's lower legs to cause the corresponding one of the lower legs to pivot at the occupant's corresponding knee.

19. The safety apparatus as claimed in claim 16 further including a fourth inflatable air bag which, as it inflates, engages the bottom of at least one of the occupant's shoes and lifts at least a corresponding one of the occupant's lower legs to cause the corresponding one of the lower legs to pivot at the occupant's corresponding knee.

20. A safety apparatus for helping to protect a vehicle occupant in the event of a vehicle collision, said safety apparatus comprising:

a first air bag inflatable into a first position adjacent one side of the lower legs of the vehicle occupant;

a second air bag inflatable into a second position adjacent the other side of the lower legs of the vehicle occupant; and a third inflatable air bag which, as it inflates, engages the bottom of at least one of the occupant's shoes and lifts at least a corresponding one of the occupant's lower legs to cause the corresponding one of the lower legs to pivot at the occupant's corresponding knee.

21. The safety apparatus as defined in claim 20 further including a fourth inflatable air bag wherein said fourth air bag is inflatable into engagement with the shin of each of the occupant's lower legs to help pivot the lower legs at the occupant's knees rearwardly in the vehicle and to cushion forward movement of the lower legs in a vehicle collision.

22. A safety apparatus for helping to protect a vehicle occupant in the event of a vehicle collision, said safety apparatus comprising:

a first air bag inflatable into a first position adjacent one side of the lower legs of the vehicle occupant;

a second air bag inflatable into a second position adjacent the other side of the lower legs of the vehicle occupant; and a third air bag inflatable into engagement with the shin of each of the occupant's lower legs to help pivot the lower legs at the occupant's knees rearwardly in the vehicle and to cushion forward movement of the lower legs in a vehicle collision.

* * * * *